United States Patent
Li et al.

(10) Patent No.: US 11,820,455 B2
(45) Date of Patent: Nov. 21, 2023

(54) SHARED BICYCLE THAT CAN BE CHARGED CONVENIENTLY

(71) Applicant: HANGZHOU QINGQI SCIENCE AND TECHNOLOGY CO., LTD., Zhejiang (CN)

(72) Inventors: Gang Li, Hangzhou (CN); Weisheng Hu, Hangzhou (CN); Shenghong Cai, Hangzhou (CN); Zaixing Li, Hangzhou (CN); Sheng Liu, Hangzhou (CN)

(73) Assignee: HANGZHOU QINGQI SCIENCE AND TECHNOLOGY CO., LTD., Hangzhou (CN)

( * ) Notice: Subject to any disclaimer, the term of this patent is extended or adjusted under 35 U.S.C. 154(b) by 959 days.

(21) Appl. No.: 16/784,417

(22) Filed: Feb. 7, 2020

(65) Prior Publication Data
US 2020/0172195 A1    Jun. 4, 2020

Related U.S. Application Data

(63) Continuation of application No. PCT/CN2018/089633, filed on Jun. 1, 2018.

(30) Foreign Application Priority Data

Aug. 7, 2017    (CN) .......................... 201720978176.3
Feb. 6, 2018    (CN) .......................... 201820205942.7

(51) Int. Cl.
*B62J 7/06*    (2006.01)
*B62M 6/85*    (2010.01)
(Continued)

(52) U.S. Cl.
CPC .............. *B62J 7/06* (2013.01); *B60R 25/403* (2013.01); *B62H 5/00* (2013.01); *B62M 6/85* (2013.01);
(Continued)

(58) Field of Classification Search
CPC .... E05B 71/00; E05B 2047/0064; B62J 7/06; B60R 25/40; B60R 25/403; B62H 5/00;
(Continued)

(56) References Cited

U.S. PATENT DOCUMENTS

2010/0120585 A1    5/2010    Quy
2013/0110265 A1    5/2013    Rahko et al.
(Continued)

FOREIGN PATENT DOCUMENTS

CN    202094824 U    12/2011
CN    104333105 A     2/2015
(Continued)

OTHER PUBLICATIONS

International Search Report in PCT/CN2018/089633 dated Sep. 18, 2018, 6 Pages.
Written Opinion in PCT/CN2018/089633 dated Sep. 18, 2018, 7 Pages.
Extended European Search Report in European Application No. 18844281.8 dated May 13, 2020, 8 pages.

*Primary Examiner* — Nathan Cumar
(74) *Attorney, Agent, or Firm* — METIS IP LLC

(57) ABSTRACT

The present disclosure relates to a shared bicycle that can be charged conveniently. The bicycle includes a front fork, a rear fork, a handle mounted on the front fork, a shopping basket mounted on the handle, a solar panel mounted on the shopping basket, and a smart lock mounted on the rear fork. The bicycle further includes a bus for data transmission and charging. One end of the bus is electrically connected to the smart lock, and the other end of the bus is configured with an interface that can be connected to an external circuit. The interface is mounted on the shopping basket. The solar panel is connected to the bus via a wire. The interface of the bus is mounted on the shopping basket without disassembling the cover plate, which provides a large operable space and makes it convenient for charging and data transmission, thereby improving the rescue efficiency.

7 Claims, 3 Drawing Sheets

(51) Int. Cl.
*H02J 7/35* (2006.01)
*B60R 25/40* (2013.01)
*B62H 5/00* (2006.01)
*E05B 71/00* (2006.01)
*E05B 47/00* (2006.01)

(52) U.S. Cl.
CPC ............... *E05B 71/00* (2013.01); *H02J 7/35* (2013.01); *E05B 2047/0064* (2013.01)

(58) Field of Classification Search
CPC ........ B62H 5/001; B62H 5/003; B62H 5/005; B62H 5/006; B62H 5/02; B62H 5/04; B62H 5/06; B62H 5/08; B62H 5/10; B62H 5/12; B62H 5/14; B62H 5/141; B62H 5/142; B62H 5/144; B62H 5/145; B62H 5/147; B62H 5/148; B62H 5/18; B62H 5/20; B62M 6/85; H02J 7/35
USPC .......................................................... 70/233
See application file for complete search history.

(56) References Cited

U.S. PATENT DOCUMENTS

| | | | |
|---|---|---|---|
| 2015/0096335 A1* | 4/2015 | Haidak | B62H 3/02 |
| | | | 70/57.1 |
| 2016/0050519 A1 | 2/2016 | Sandin | |
| 2017/0036722 A1 | 2/2017 | Assénat et al. | |

FOREIGN PATENT DOCUMENTS

| | | | | |
|---|---|---|---|---|
| CN | 205422220 U | | 8/2016 | |
| CN | 106864635 A | | 6/2017 | |
| CN | 106892028 A | * | 6/2017 | |
| CN | 106892028 A | | 6/2017 | |
| CN | 106978947 A | | 7/2017 | |
| EP | 1295784 A2 | * | 3/2003 | ............. B60L 50/53 |
| EP | 1295784 A2 | | 3/2003 | |
| JP | 2006316601 A | | 11/2006 | |
| TW | M464359 U | | 11/2013 | |

* cited by examiner ated to the manual charging cable. The solar panel and the charging interface may be connected in parallel.

Further, the interface may include five conductive pins, three of which may be charging conductive pins, and the other two of which may be data conductive pins. The solar panel and the charging conductive pins may be connected in parallel.

The present disclosure provides a shared bicycle that can be charged conveniently. The interface of the bus is mounted on the shopping basket without disassembling the cover plate, which provides a large operable space and makes it convenient for charging and data transmission, thereby improving the rescue efficiency.

SHARED BICYCLE THAT CAN BE CHARGED CONVENIENTLY

CROSS-REFERENCE TO RELATED APPLICATIONS

This application is a continuation of International Application No. PCT/CN2018/089633, filed on Jun. 1, 2018, which claims priority to Chinese Patent Application NO. 201820205942.7, filed on Feb. 6, 2018, Chinese Patent Application NO. 201720978176.3, filed on Aug. 7, 2017, the entire contents of each of which are hereby incorporated by reference.

TECHNICAL FIELD

The present disclosure relates to the field of bicycles, and specifically, to a shared bicycle that can be charged conveniently.

BACKGROUND

An existing shared bicycle is equipped with a smart lock, and the smart lock needs electrical power. Conventional solutions may include: 1. installing a lithium battery in the smart lock to store electrical energy; 2. placing a solar panel in a shopping basket that is in the front of the bicycle, and charging the lithium battery via a solar charging cable. The smart lock may also include a data cable and a manual charging cable. The manual charging cable is connected in parallel with the solar charging cable. In the absence of sunlight, the lithium battery can be charged via the manual charging cable. Because the smart lock is mounted on a rear fork of the bicycle, and both the interfaces of the data cable and manual charging cable are mounted on the rear fork, the cover plate may need to be disassembled to take out the data cable and manual charging cable for manual charging or data transmission, which is troublesome and inconvenient. Therefore, it is necessary to improve the layout of the circuit of the bicycle.

SUMMARY

The present disclosure provides a shared bicycle that can be charged conveniently, which can solve technical problems of inconvenient operation when the bicycle is charged manually.

The technical solution adopted by the present disclosure to solve the technical problem is to provide a shared bicycle that can be charged conveniently shared bicycle. The bicycle may include a front fork, a rear fork, a handle mounted on the front fork, a shopping basket mounted on the handle, a solar panel mounted on the shopping basket, and a smart lock mounted on the rear fork. The bicycle may further include a bus for data transmission and charging. One end of the bus may be electrically connected to the smart lock, the other end of the bus may be configured with an interface that can be connected to an external circuit. The interface may be disposed on the shopping basket. The solar panel may be connected to the bus via a wire.

Further, the interface of the bus may be mounted under the solar panel.

Further, the interface of the bus may be mounted under the bottom of the shopping basket through a circuit box.

Further, the bus may include a data cable and a manual charging cable. The interface may include a data interface connected to the data cable and a charging interface connected to the manual charging cable. The solar panel and the charging interface may be connected in parallel.

Further, the interface may include five conductive pins, three of which may be charging conductive pins, and the other two of which may be data conductive pins. The solar panel and the charging conductive pins may be connected in parallel.

The present disclosure provides a shared bicycle that can be charged conveniently. The interface of the bus is mounted on the shopping basket without disassembling the cover plate, which provides a large operable space and makes it convenient for charging and data transmission, thereby improving the rescue efficiency.

BRIEF DESCRIPTION OF THE DRAWINGS

The present disclosure is further described in detail of exemplary embodiments. These exemplary embodiments are described in detail with reference to the drawings, wherein.

DETAILED DESCRIPTION

A preferred embodiment of the present disclosure will be described in detail with reference to the drawings.

Figure 1:
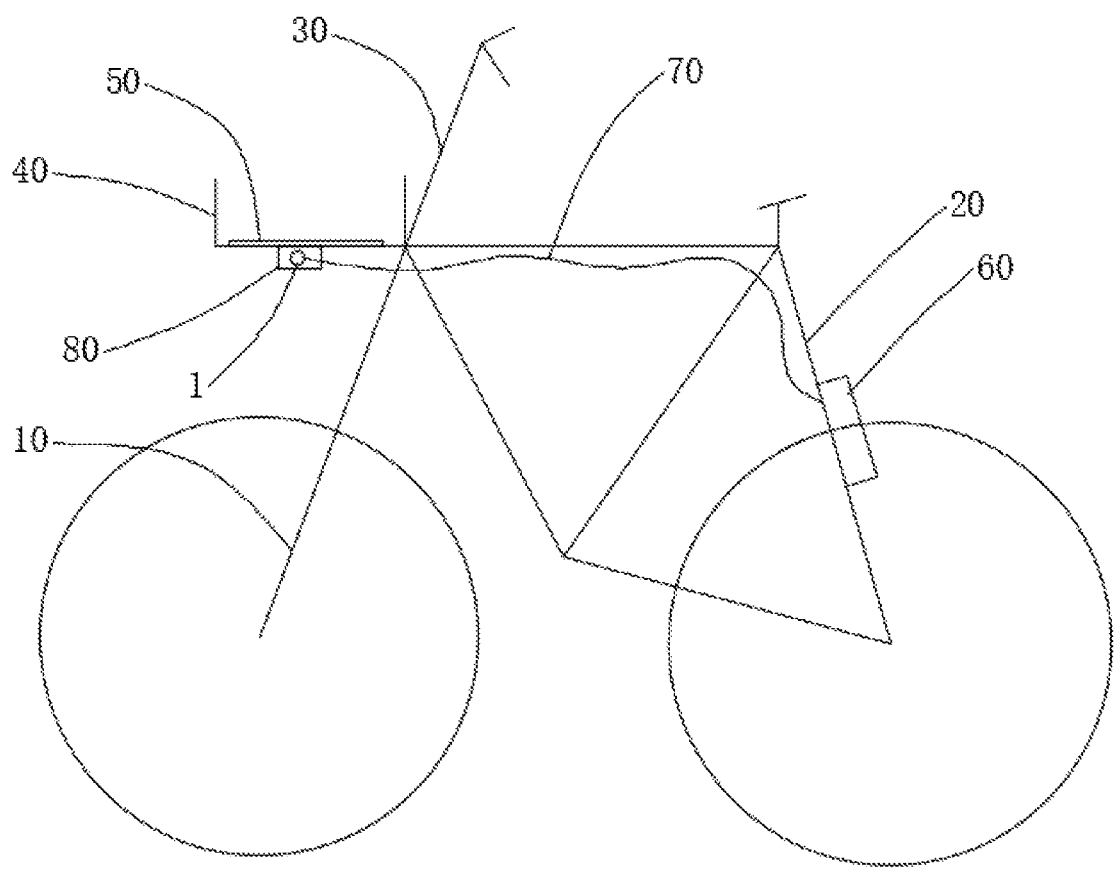
FIG. 1 is a diagram illustrating a structure of a shared bicycle that can be charged conveniently according to some embodiments of the present disclosure.

As shown in FIG. 1, the present disclosure may provide a shared bicycle that can be charged conveniently. The bicycle may include a front fork 10, a rear fork 20, a handle 30 mounted on the front fork 10, a shopping basket 40 mounted on the handle 30, a solar panel 50 mounted on the shopping basket 40, and a smart lock 60 mounted on the rear fork 20. The bicycle may further include a bus 70 for data transmission and charging. One end of the bus 70 may be electrically connected to the smart lock 60, and the other end of the bus 70 may be configured with an interface 1 that can be connected to an external circuit. The interface 1 may be mounted on the shopping basket 40. The solar panel 50 may be connected to the bus 70 via a wire. The solar panel 50 may charge the smart lock 60 in the presence of light. When the shared bicycle is in a dark environment for a long time, the battery in the smart lock 60 cannot be continuously powered, so it needs to be rescued by the staff, that is, the smart lock 60 needs to be charged manually. In manual charging, because that the interface of the bus 70 is mounted on the shopping basket 40, there is no need to disassemble the cover plate, which provides a large operable space and makes it convenient for charging and data transmission.

In some embodiments, the interface of the bus 70 may be mounted under the solar panel 50. The solar panel 50 may shield the interface without affecting the overall appearance of the bicycle. Specifically, the interface of the bus 70 may be mounted under the bottom of the shopping basket 40 through a circuit box 80. One or more essential circuit devices may be installed in the circuit box 80.

Two structures of the bus 70 are as described below.

Figure 2:
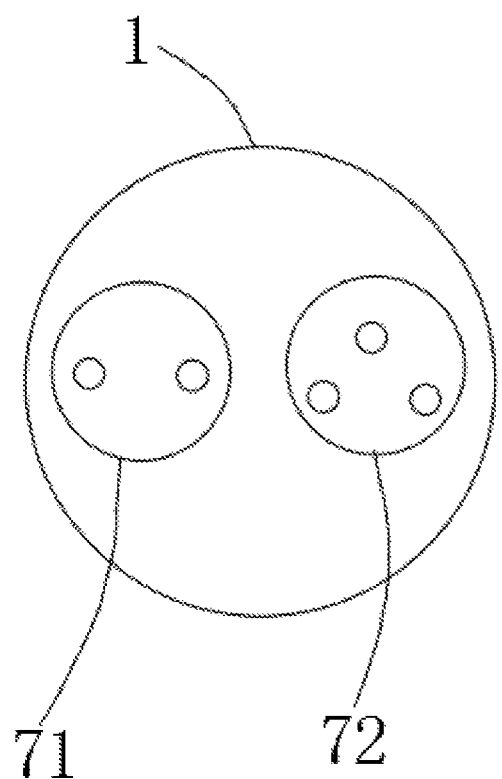
FIG. 2 is a diagram illustrating a cross-sectional view of an interface of a bus in FIG. 1 according to some embodiments of the present disclosure.

As shown in FIG. 2, the bus 70 may include a data cable and a manual charging cable. The interface 1 may include a data interface 71 connected to the data cable and a charging interface 72 connected to the manual charging cable. The solar panel 50 and the charging interface 72 may be connected in parallel. The solar panel 50 and the charging interface 72 are connected in parallel, so that the solar panel 50 may charge the smart lock 60 under normal conditions. Manual charging may be achieved by connecting the charging interface 72 to an external power source. Data transmission may be achieved by connecting the interface of the data cable 71 to a laptop. Therefore, the operation is simple and convenient, which greatly improves the rescue efficiency and maintenance efficiency.

Figure 3:
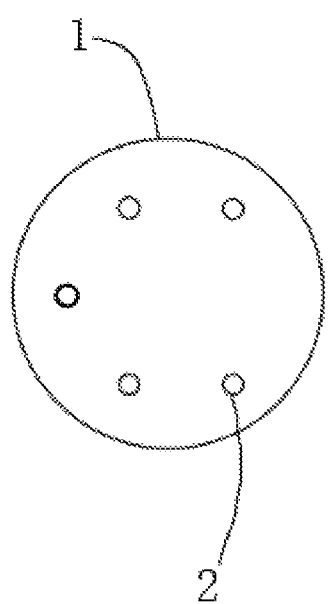
FIG. 3 is a diagram illustrating a cross-sectional view of an interface of a bus in FIG. 1 according to some alternative embodiments.

As shown in FIG. 3, five conductive pins 2 may be installed in the interface 1 of the bus 70, three of which may be charging conductive pins, and the other two of which may be data conductive pins. The solar panel 50 and the charging conductive pins may be connected in parallel. The solar panel 50 and the charging conductive pins are connected in parallel, so that the solar panel 50 may charge the smart lock 60 under normal conditions. Charging and data transmission may be achieved at the same time by connecting the interface to a corresponding equipment. Therefore, the operation is simple and convenient, which greatly improves the rescue efficiency and maintenance efficiency.

It should be understood that the above embodiments are only provided to illustrate the technical solution of the present disclosure, and are not intended to limit the scope of the present disclosure. For those skilled in the art, modifications to the technical solution described in the above embodiments, or equivalent replacements of some of the technical features may be made, and the modifications and replacements of the embodiments of the present disclosure are within the scope of the appended claims of the present disclosure.

We claim:

1. A shared bicycle that can be charged conveniently, comprising:
   a front fork;
   a rear fork;
   a handle mounted on the front fork;
   a shopping basket mounted on the handle;
   a solar panel mounted on the shopping basket; and
   a smart lock mounted on the rear fork;
   wherein the bicycle further includes a bus for data transmission and charging, one end of the bus is electrically connected to the smart lock, the other end of the bus is configured with an interface that can be connected to an external circuit, the interface is mounted on the shopping basket, the solar panel is connected to the bus via a wire.

2. The shared bicycle that can be charged conveniently of claim 1, wherein the interface of the bus is mounted under the solar panel.

3. The shared bicycle that can be charged conveniently of claim 2, wherein the interface of the bus is mounted under the bottom of the shopping basket through a circuit box.

4. The shared bicycle that can be charged conveniently of claim 1, wherein the bus includes a data cable and a manual charging cable, the interface includes a data interface connected to the data cable and a charging interface connected to the manual charging cable.

5. The shared bicycle that can be charged conveniently of claim 1, wherein the interface includes five conductive pins, three of which are charging conductive pins, the other two of which are data conductive pins.

6. The shared bicycle that can be charged conveniently of claim 4, wherein the solar panel and the charging interface are connected in parallel.

7. The shared bicycle that can be charged conveniently of claim 5, wherein the solar panel and the charging conductive pins are connected in parallel.

* * * * *